United States Patent
Braunberger

(10) Patent No.: US 6,801,477 B2
(45) Date of Patent: Oct. 5, 2004

(54) TIMING SYSTEM AND DEVICE AND METHOD FOR MAKING THE SAME

(75) Inventor: Alfred S. Braunberger, Thousand Oaks, CA (US)

(73) Assignee: Vision Works, LLC, Thousand Oaks, CA (US)

(*) Notice: Subject to any disclaimer, the term of this patent is extended or adjusted under 35 U.S.C. 154(b) by 0 days.

(21) Appl. No.: 10/319,233

(22) Filed: Dec. 13, 2002

(65) Prior Publication Data

US 2003/0112711 A1 Jun. 19, 2003

Related U.S. Application Data

(60) Provisional application No. 60/339,744, filed on Dec. 13, 2001.

(51) Int. Cl.[7] .................. G04B 47/00; G01N 21/00; G01N 31/22
(52) U.S. Cl. .................. 368/327; 368/10; 422/55; 422/58
(58) Field of Search ............... 368/327, 10; 422/56–58, 422/61, 55

(56) References Cited

U.S. PATENT DOCUMENTS

| | | | |
|---|---|---|---|
| 3,999,946 A | 12/1976 | Patel et al. .............. 23/253 TP |
| 4,212,153 A | 7/1980 | Kydonieus et al. ........... 368/62 |
| 4,327,117 A | 4/1982 | Lenack et al. ................ 426/88 |
| 5,034,233 A | 7/1991 | McCloy, Jr. ................. 426/88 |
| 5,045,283 A | 9/1991 | Patel ........................... 422/56 |
| 5,053,339 A | 10/1991 | Patel ............................ 436/2 |
| 5,085,802 A | 2/1992 | Jalinski ................... 252/408.1 |
| 5,182,212 A | 1/1993 | Jalinski ......................... 436/2 |
| 5,254,473 A | 10/1993 | Patel ............................. 436/1 |
| 5,420,000 A | * 5/1995 | Patel et al. .................. 430/332 |
| 5,446,705 A | 8/1995 | Haas et al. ................ 368/327 |
| 5,602,804 A | 2/1997 | Haas ......................... 368/327 |
| 5,633,835 A | 5/1997 | Haas et al. ................ 368/327 |
| 5,667,303 A | 9/1997 | Arens et al. ............... 374/102 |
| 5,672,465 A | * 9/1997 | Patel et al. ................. 430/332 |
| 5,699,326 A | 12/1997 | Haas et al. ................ 368/327 |
| 5,709,472 A | 1/1998 | Prusik et al. .............. 374/106 |
| 5,756,356 A | 5/1998 | Yanagi et al. .................. 436/7 |
| 5,785,354 A | 7/1998 | Haas ............................ 283/74 |
| 5,797,344 A | * 8/1998 | Ramsey et al. ............. 116/206 |
| 5,802,015 A | * 9/1998 | Rothschild et al. ........... 368/10 |
| 5,822,280 A | * 10/1998 | Haas .......................... 368/327 |
| 5,830,683 A | 11/1998 | Hendricks et al. ............ 435/31 |
| 5,930,206 A | * 7/1999 | Haas et al. ................. 368/327 |
| 5,947,369 A | 9/1999 | Frommer et al. ........... 233/382 |
| 5,989,852 A | 11/1999 | Hendricks et al. ............ 435/31 |
| 5,997,927 A | 12/1999 | Gics ........................... 426/383 |
| 6,042,264 A | 3/2000 | Prusik et al. ............... 374/106 |
| 6,103,351 A | 8/2000 | Ram et al. .................. 428/195 |
| 6,113,857 A | * 9/2000 | Manico et al. ................. 422/61 |
| 6,244,208 B1 | 6/2001 | Qiu et al. ................... 116/207 |
| 6,269,764 B1 | 8/2001 | Adamy et al. .............. 116/206 |
| 6,295,252 B1 | 9/2001 | Holt et al. .................. 368/327 |
| 6,331,076 B1 | 12/2001 | Coll ............................ 374/102 |
| 6,373,786 B1 | 4/2002 | Kagan et al. ................. 368/10 |
| 6,435,128 B2 | 8/2002 | Qiu et al. ................... 116/207 |
| 6,452,873 B1 | 9/2002 | Holt et al. .................. 368/327 |
| 6,544,925 B1 | * 4/2003 | Prusik et al. ............... 503/201 |

FOREIGN PATENT DOCUMENTS

WO    WO 01/82006 A1    11/2001    ............. G04F/1/00

* cited by examiner

Primary Examiner—Randy W. Gibson
Assistant Examiner—Michael L. Lindinger
(74) Attorney, Agent, or Firm—Haverstock & Owens LLP

(57) ABSTRACT

A timing device for visually indicating the passage of a duration of time is disclosed. The timing device comprises a lens, a base and an optical medium therebetween. The optical medium preferably comprises one or more materials, layers or components that chemically or electrochemically change the duration of time. The timing device preferably comprises an opaque layer positioned between the lens and the base, wherein the opaque layer is dissolved over the duration of time, thereby making the base visible through the lens. The timing device is preferably fabricated in parts with reactive regions which are configured to couple together to form an activated device. In further embodiments of the invention, the device comprises means to generate an audible signal when the duration of time has passed and/or thermosensor for actuating the device within a range of temperatures.

24 Claims, 4 Drawing Sheets

TIMING SYSTEM AND DEVICE AND METHOD FOR MAKING THE SAME

RELATED APPLICATION(S)

This Patent Application claims priority under 35 U.S.C. 119 (e) of the co-pending U.S. Provisional Patent Application, Ser. No. 60/339,744 filed Dec. 13, 2001, and entitled "TIME DOT". The Provisional Patent Application, Ser. No. 60/339,744 filed Dec. 13, 2001, and entitled "TIME DOT" is also hereby incorporated by reference.

FIELD OF THE INVENTION

The invention relates to timing systems and devices and a method for making the same. More specifically, the invention relates to systems and devices for and methods of indicating the passage of a duration time.

BACKGROUND OF THE INVENTION

There are a number of different timing systems and devices, generally referred to as time-temperature indicators (TTIs) which can be used to monitor the exposure of objects to a range of temperatures over a specified period of time. In an early example, Witonsky, in U.S. Pat. No. 3,942,467 describes a time-temperature indicator with an encapsulated inner container and a pH sensitive dye solution contained therein. The device of Witonsky further has an encapsulated outer container containing an organic material which undergoes solvolysis. The outer container and the inner container are separated by a membrane. When the membrane between the inner and the outer container is broken, the contents of the containers mix and over a period of time change color thus providing an indication of the passage of a duration of time. A number of other time-temperature indicators utilize wicking techniques (such as described in U.S. Pat. No. 5,709,472 and U.S. Pat. No. 6,042,264, both issued to Prusik et al.) or diffusion layer techniques (such as described in U.S. Pat. No. 4,629,330 issued to Nichols and U.S. Pat. Nos. 5,930,206 and 5,633,835 both issued to Haas et al.). In U.S. Pat. No. 6,198,701 issued to De Jonghe et al., an electrochemical timing device is described, whereby consumption of an electrode is used to provide an indication of the passage of a duration of time.

Time-temperature indicators can have a number of different applications for indicating when an event or activity needs to take place. For example, time-temperature indicators have applications for indicating when the perishable materials have expired and need to be thrown out. Time-temperature indicators also have applications for general inventory management, for monitoring projects, activities and a host of other time and/or temperature dependent events. Therefore, there is a continued need to develop reliable timing systems and devices which can be used for a variety of different applications.

SUMMARY OF THE INVENTION

The present invention is directed to a device and system for indicating the passage of a duration of time and a method of making the same. While, the present invention is referred to herein as a timing device, it is understood that the timing device of the present invention is also sensitive to temperature. While a timing device, in accordance with the embodiments of the invention, can be configured to be more or less sensitive to temperature, the timing device will generally react, or change, at a faster rate at higher temperatures.

A timing device, in accordance with the embodiments of the present invention is a chemical-based timing device, electrochemical-based timing device, or a combination thereof. The timing device, when actuated, provides a visual indication of a passage of time. The timing device is configured as a "stand alone" indicator or, alternatively, is configured to be coupled with any number circuits which also provide an audible signal or otherwise sense and/or store information regarding the operation of the device.

The device preferably comprises a lens, a base and means for altering the visibility of the base through the lens and thereby indicating the passage of a duration of time. The means for altering the visibility of the base through the lens preferably comprises an optical medium positioned between the lens and the base. The optical medium comprises chemicals and/or elements of a battery that react or otherwise change over time and, thereby alters the visibility of the base through the lens. For example, one or more of the materials, layers or components of the optical medium are converted from opaque to transparent or, alternatively, from transparent to opaque, thereby increasing or decreasing the visibility of the base through the lens, respectfully. Alternately, one or more of the materials, layers or components of the optical medium are dissolved or depleted, thereby altering the visibility of the base through the lens.

In accordance with the embodiments of the invention, the optical medium comprises a solid layer positioned between the lens and the base, also referred to herein as a lens coating layer, and a fluid layer positioned between the solid layer and the base. The fluid layer contains gel, water and any suitable chemical(s) required to change the solid layer from opaque to transparent, change the layer from transparent to opaque, deplete the solid layer or dissolve the solid layer, as explained in detail below. In the preferred embodiment of the invention, the solid layer is opaque and when the device is actuated, the fluid layer dissolves the solid layer over a duration of time, thereby making the base visible through the lens and indicating the passage of a duration of time.

In further embodiments of the invention, a timing device comprises an indicator between the lens and the lens coating layer to enhance the visual indication of the passage of time. Suitable indicators are fluids or solid, and can include, but are not limited to pH indicators and reactive dye indicators, which generate a color change when reacted with the fluid layer, after the fluid layer sufficiently depletes or dissolves the lens coating layer. Alternatively, the lens coating layer is a semi-porous membrane layer, wherein the indicator provides a color change when a sufficient amount of the reactive species from the fluid medium migrates through the membrane layer.

In still further embodiments of the invention, a timing device comprises a battery, wherein at least a portion of the optical medium between the solid layer and the base actively participates in an electrochemical process resulting in a visual change indicating the passage of a duration of time. In accordance with this embodiment of the invention, the battery is a galvanic cell and the optical medium comprises an electrolyte. A galvanic cell is a battery where reduction and oxidation of species within the battery will occur spontaneously as long as there is a conductive path from a first electrode of the cell to a second electrode of the cell. In operation a material within the electrolyte is plated between the base and the lens, thereby reducing the visibility of the base through the lens. Alternatively, an opaque electrode positioned between the lens and the base is depleted, thereby increasing the visibility of the base through the lens.

In still further embodiments of the invention, the battery is an electrolytic cell. An electrolytic cell requires a current from another battery, or other current source to drive the reduction and oxidation of species within the battery. In accordance with this embodiment, a current from an external battery or current source, flows through the battery and a material within the electrolyte is plated out between the lens and the base, thereby reducing the visibility of the base through the lens. Alternatively, an opaque electrode positioned between the lens and the base is depleted, thereby increasing the visibility of the base through the lens.

A timing device, in accordance with the embodiments of the invention, is actuated using any number of different mechanisms or combination of mechanisms. For example, where the timing device is a chemical-based timing device, the timing device is preferably formed in parts, wherein a first part comprises a first reactive region and a second part comprises a second reactive region. To form an activated device, the first part and the second part are brought together and the first reactive region and the second reactive region are held eclipsed and in contact. Alternatively, a chemical-based timing device comprises a membrane or a removable structure separating the reactive regions of the device, wherein the membrane is broken or the structure is removed to activate the device.

Where the timing device is an electrochemical-based timing device, the device is preferably actuated by a switch mechanism that closes a circuit between electrode elements of a galvanic or an electrolytic cell. Alternatively, the device is fabricated in parts as described above, wherein the parts have contact features, which when brought together close a circuit between the electrode elements of a galvanic or an electrolytic cell. An actuator switch, in accordance with further embodiments of the invention, is in electrical communication with a thermosensor, wherein the thermosensor instructs the actuator switch to close a circuit between electrode elements of a galvanic or an electrolytic cell within a range of temperatures.

DETAILED DESCRIPTION OF THE INVENTION

Figure 1A:
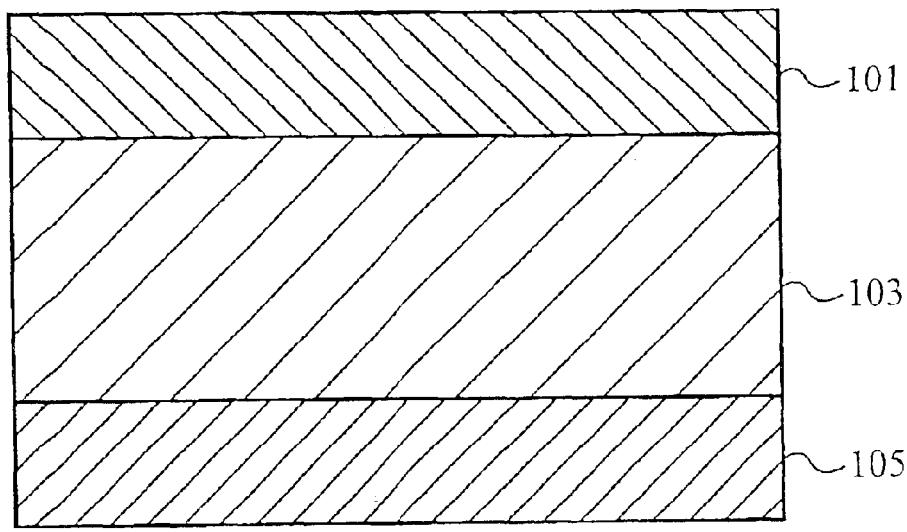
FIGS. 1A–B show a schematic representation of a timing device, in accordance with the embodiments of the invention.
Figure 1B:
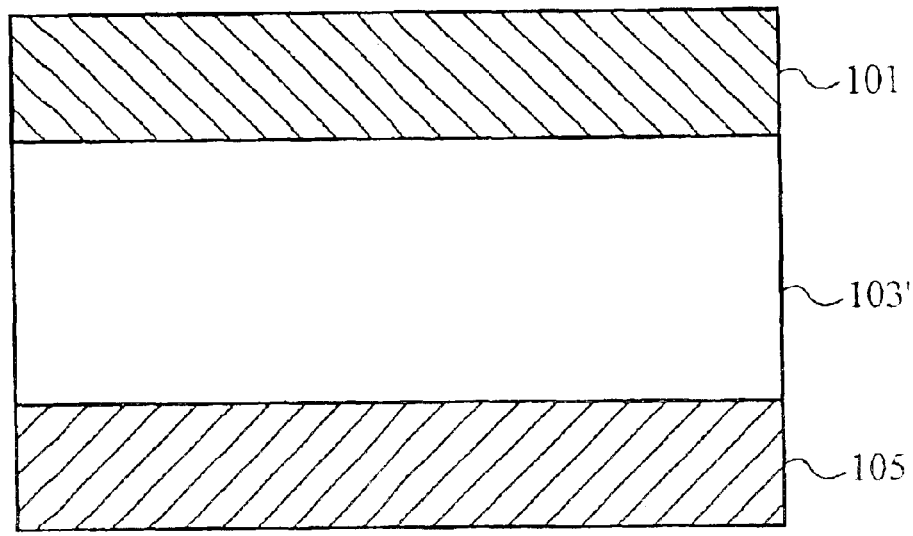

Referring to FIGS. 1A–B, a timing device 100, in accordance with the embodiments of the invention is a chemical-based timing device, an electrochemical-based timing device, or a combination thereof. The timing device 100 comprises a transparent lens 101, a base 105 and an optical medium 103 therebetween. When the device 100 is actuated, the optical medium 103 is changed to a modified medium 103', thereby altering the visibility of the base 105 through the lens 101 indicating the passage of a duration of time. The lens 101 and base 105 are formed from any suitable material, or combination of materials, including, but not limited to polymers and plastic materials.

Still referring to FIGS. 1A–B, the optical medium 103 comprises any number of different chemicals or elements which over the duration of time alter the visibility of the base 105 through the lens, as explained in detail below. Preferably, however, the base 105 becomes more visible through the lens 101 when the device 100 has expired. In order to enhance the visibility of the base 105 through the lens 101 when the device 100 has expired, the base 105 is preferably brightly colored and/or has indicia printed thereon, such that the bright color and/or the indicia are visible through the lens 101 when the device is expired.

Figure 2:
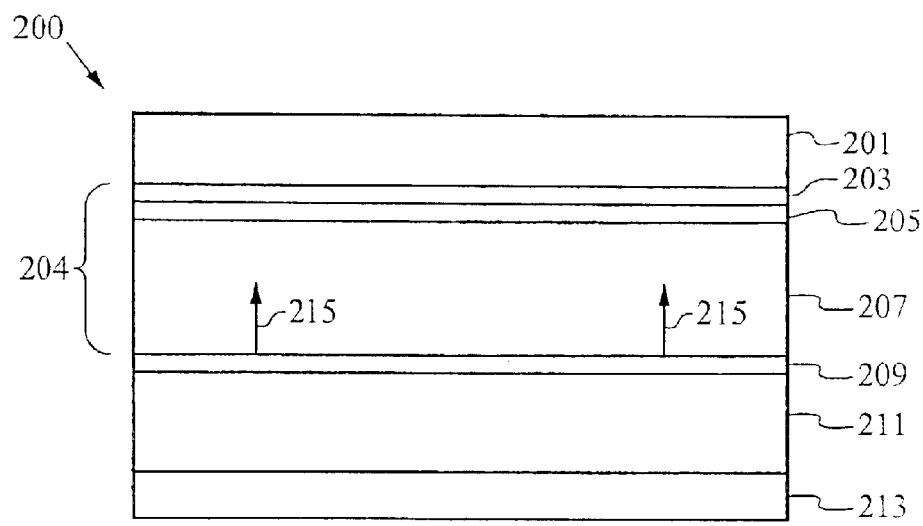
FIG. 2 shows a schematic representation of a timing device, in accordance with a preferred embodiment of the invention.

Referring now to FIG. 2, in accordance with a preferred embodiment of the invention, a timing device 200 comprises a lens 201, a base 211 and an optical medium 204, as described above. The optical medium 204 preferably comprises a fluid layer 207. The fluid layer 207 can be comprised of any number of fluid materials, but preferably comprises a transparent gel material, which is either acid or basic and which is either conductive or insulating, depending on the application at hand. The optical medium 204 also preferably comprises an opaque layer 205, also referred to herein as a lens coating layer, which does not imply that the opaque layer 205 is necessarily coated directly on the lens 201. The lens coating 205 is preferably formed from a material which will react with the fluid layer 207, when the device 200 is activated. For example, the lens coating layer 205 is formed from a hardened gel, such as gelatin and thiosulfate. Preferably, the liquid layer 207 dissolves the lens coating layer 205 when the device 200 is activated, thereby increasing the visibility of the base therebelow and indicating the passage of a duration of time.

Still referring to FIG. 2, in further embodiments of the invention a timing device 200 comprises an activation layer 203. The activation layer 203 comprises an indicator, such as a pH indicator which reacts with the fluid layer 207, when the fluid layer 207 sufficiently depletes or dissolves the lens coating layer 205. Alternatively, an indicator is incorporated into the lens coating layer 205 and is dissolved or leached by the fluid layer 207, such that when the concentration of the indicator in the fluid layer 207 becomes sufficiently high, the fluid layer 207 changes color.

In still further embodiments of the invention, the lens coating layer comprises a reactive species that reacts with an indicator in the fluid layer 207. For example, the lens coating layer 205 comprises a base material, such as sodium bicarbonate, which is leached from the lens coating layer 205 or is dissolved into the fluid layer 207 from the lens coating layer 205. The fluid layer 207 comprises a pH indicator and an acid material and when a sufficient amount of base material is dissolved into the fluid layer 207, then the acid material is naturalized and the pH indicator changes color, indicating the passage of a duration of time.

In still further embodiments of the invention, a timing device 200 comprises a diffusion material 209. When the device 200 is activated, the diffusion material 209 begins to diffuse through the fluid layer 207, as indicated by the arrows 215. When the diffusion material 209 reaches the lens coating layer 205, the diffusion material 209 reacts with the lens coating layer 205 to provide a color change, dissolve the lens coating layer 205 and react with the indicator layer 203, or any combination thereof, to indicate the passage of a duration of time.

Still referring to FIG. 2, a timing device 200, in accordance with the embodiments of the present invention also comprises an attaching means 213 for attaching the timing device 200 to a product or an object (not shown). The attaching means 213 is any suitable attaching means, and preferably comprises an adhesive layer for sticking the device 200 onto the product or object.

Figure 3A:
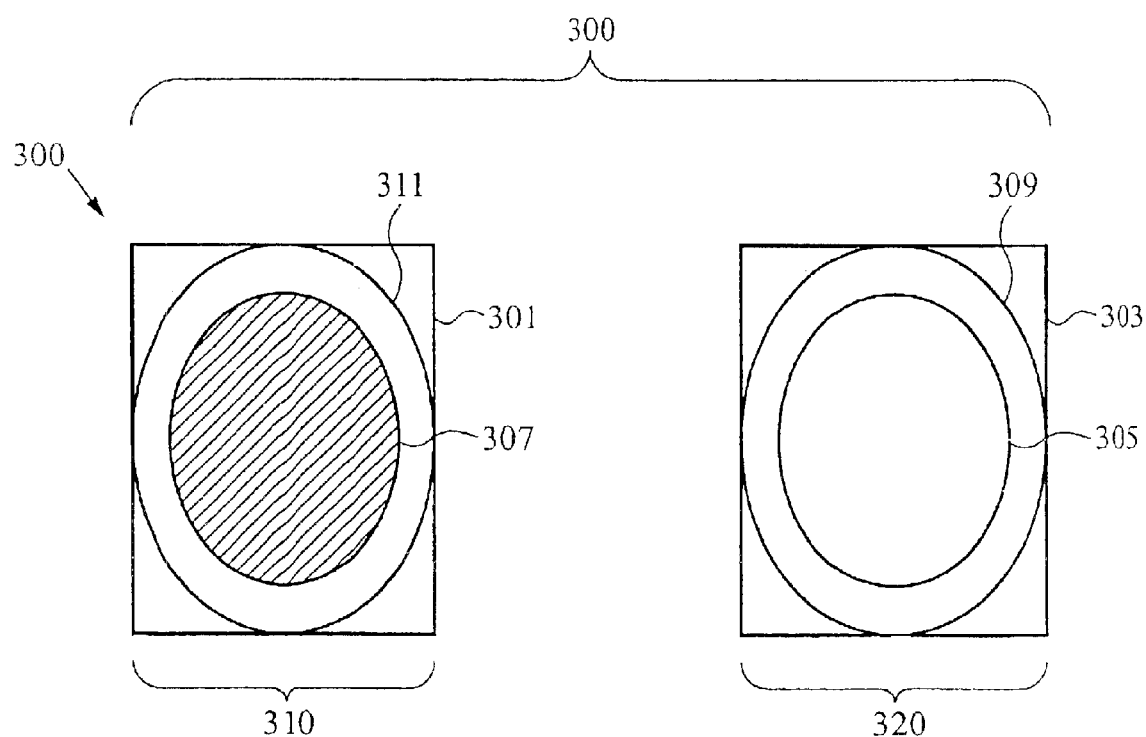
FIGS. 3A–C show systems for assembling timing devices, in accordance with the method of the present invention.

Now referring to FIG. 3A, a timing system 300, in accordance with a preferred method of the invention, is fabricated in parts 310 and 320. A first part 310 of the system 300 comprises a first reactive region 307 formed on a suitable base 301. A second part 320 of the system 300 comprises a second reaction region 305 formed on a clear lens 303. One or both of the parts 310 and 320 comprise adhesive rings 311 and 309. To actuate the system 300, the parts are brought together such that the first reactive region 307 and the second reactive region 305 are eclipsed and in contact with each other. The adhesive rings 311 and 309 hold the first part 310 and the second part 320 together with the reactive regions 305 and 307 eclipsed and in contact. While in contact with each other, the first reactive region 307 and the second reactive region 305, undergo a chemical, physical or electrochemical process which alters the visibility of the base 310 through the lens 303, as described above. Each of the parts 310 and 320 of the system 300, in accordance with further embodiments of the invention, comprise a protective covering (not shown), such as a cellophane, which acts protective of the reactive regions 307 and 305, and is removed prior to use.

Figure 3B:
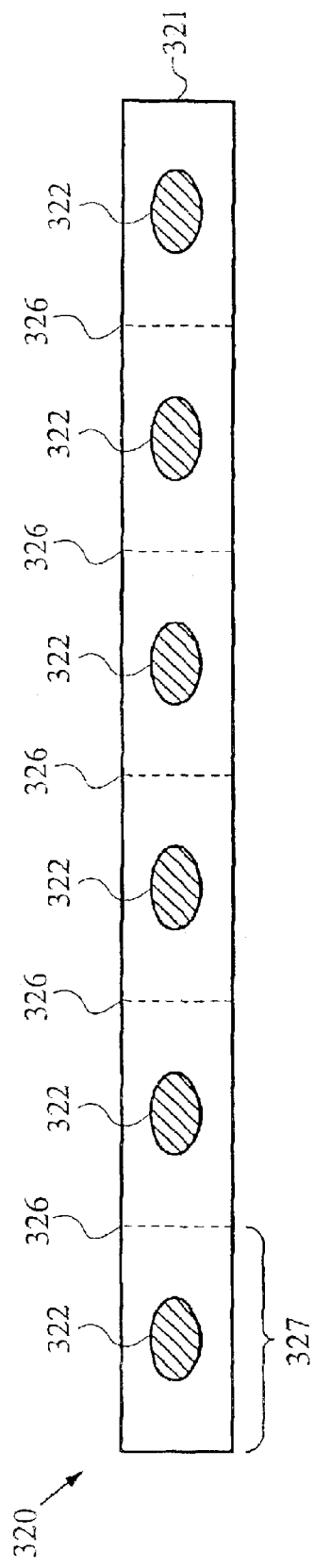

Now referring to FIG. 3B, a system 320, in accordance with the embodiments of the invention, is formed by fabricating a plurality of first reactive regions 322 on a first piece of tape 321 and a plurality of second reactive regions 324 on a second piece of tape 323. The tapes 321 and 323 preferably have perforations 326 and 328 between each of the first reactive regions 322 and the second reactive regions 324. The tapes 321 and 323 are preferably configured to be dispensed from a roll dispenser (not shown). In use, an activated device is formed by removing a first part 327 comprising a first reactive region 322 and a second part 329 comprising a second reaction region 324 from the tapes 321 and 323 through the perforations 326 and 328, respectively. The first part 327 and the second part 329 are then combined with the first reactive region 322 and the second reactive region 324 eclipsed and in contact, as explained in detail above.

Figure 3C:
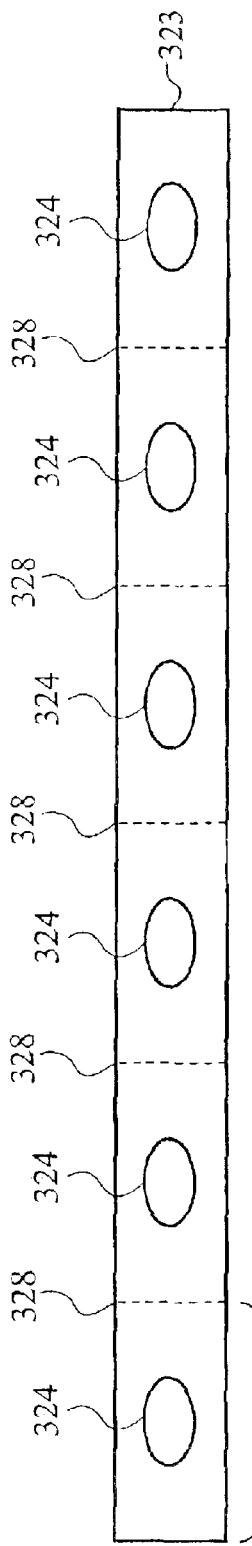
Figure 3C:
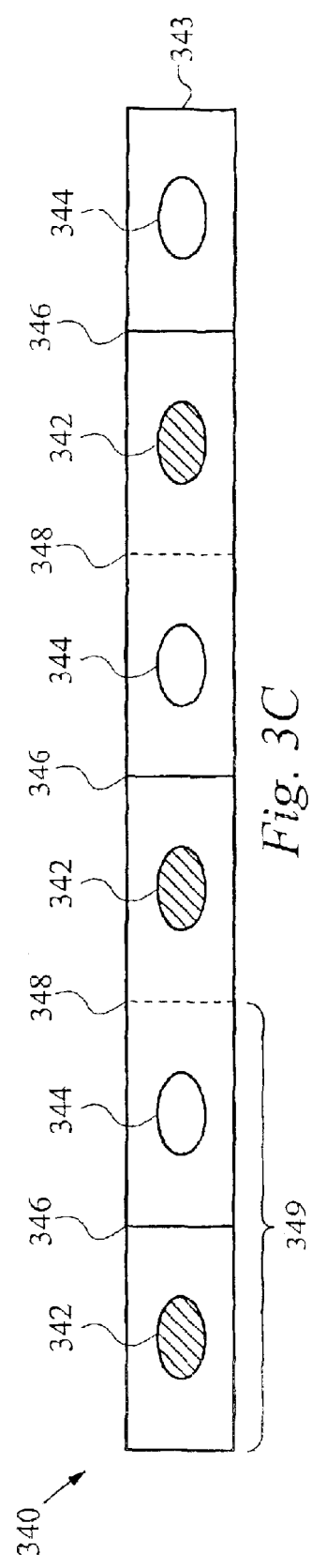

Now referring to FIG. 3C, in accordance with alternative embodiments of the invention, a system 340 comprises a plurality of first reactive regions 342 and second reactive regions 344 formed in an alternating fashion on single piece of tape 343. In use, an activated device is formed from a section 349 comprising a first reactive region 342 and a second reactive region 344 that is separated from the tape 343 through a perforation 348. The section 349 is then folded over onto itself through a seam 346, such that the first reactive region 342 and the second reactive region 348 are eclipsed and in contact with each other. While FIG. 3C, shows the first reactive regions 342 and the second reactive regions 344 being formed in an alternating fashion on single piece of tape 343 such that an active device is formed by folding one of the first reactive regions 342 and one of the second reactive regions 344 in an end-to-end fashion, it will be clear to one skilled in the art that a system can alternatively be formed on single piece of tape with first reactive regions and second reactive regions formed in rows, such that an active device is formed by folding one of the first reactive regions 342 and one of the second reactive regions 344 in a side-to-side fashion.

Figure 4A:
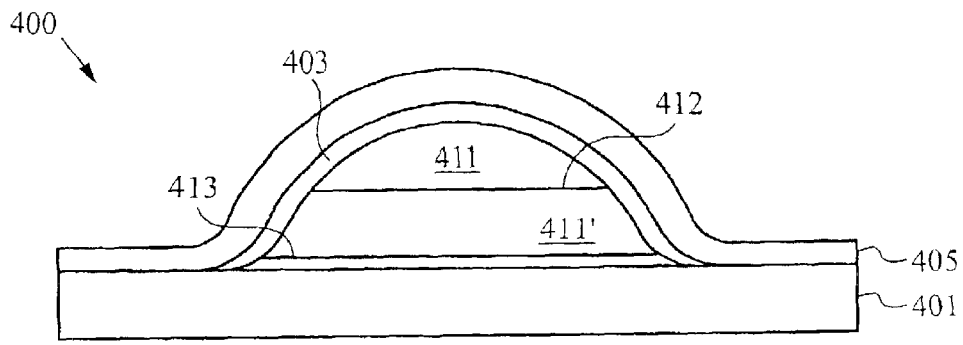
FIGS. 4A–C show schematic cross sectional views of several timing device configurations, in accordance with the embodiments of the invention.

FIG. 4A shows a cross sectional view of a timing device 400, in accordance with the embodiments of the invention. As described previously the device 400 comprises a lens 405 and a base 401. The device 400 also comprises an optical medium with one or more fluid layers 411 and 411' and a membrane structure 412 therebetween. The device 400 further comprises a lens coating layer 403 and a reactive material 413 that is capable of reacting with the lens coating layer 403. To activate the timing device 400, the membrane structure 403 is ruptured allowing the reactive material 413 to mix with the fluid layers 411 and 411' and react with the lens coating layer 403, thereby indicating the passage of a duration of time.

Figure 4B:
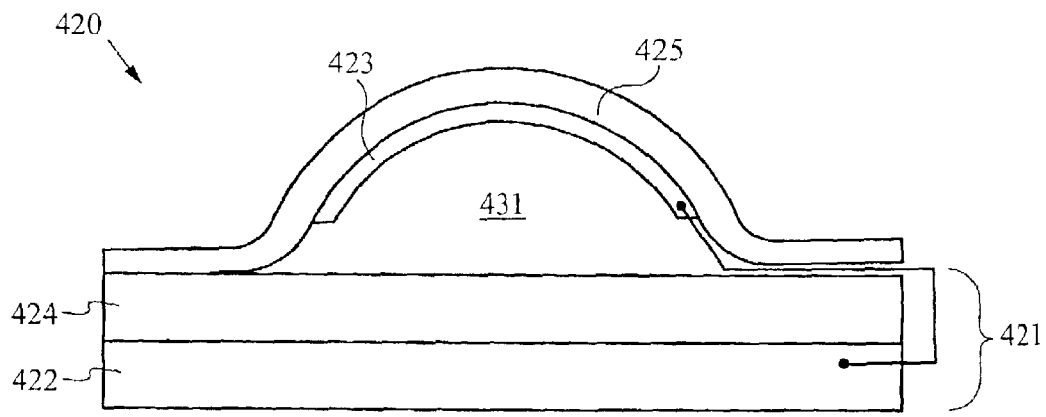

Referring now to FIG. 4B, a timing device 420, in accordance with further embodiments of the invention, comprises a lens, a metal base structure 421 and an ionic fluid medium 431, therebetween. The metal base structure 421 is formed from a first metal layer 424 with a first reduction potential and a second metal layer 422 with a second reduction potential that is substantially different from the first metal layer 424. The device 420 also has metal lens coating layer 423 with a reduction potential that is also substantially different from the first metal layer 424, but can be the same or nearly the same as the reduction potential of the second metal layer 422. To actuate the device the metal lens coating layer 423 and the second metal layer 422 are placed in electrical communication with each other. The potential difference between the first metal layer 424 and the second metal layer 422 will drive a current to flow and cause the metal lens coating layer 423 to become depleted over time, and plate out over the first metal layer, thereby indicating the passage of a duration of time.

Figure 4C:
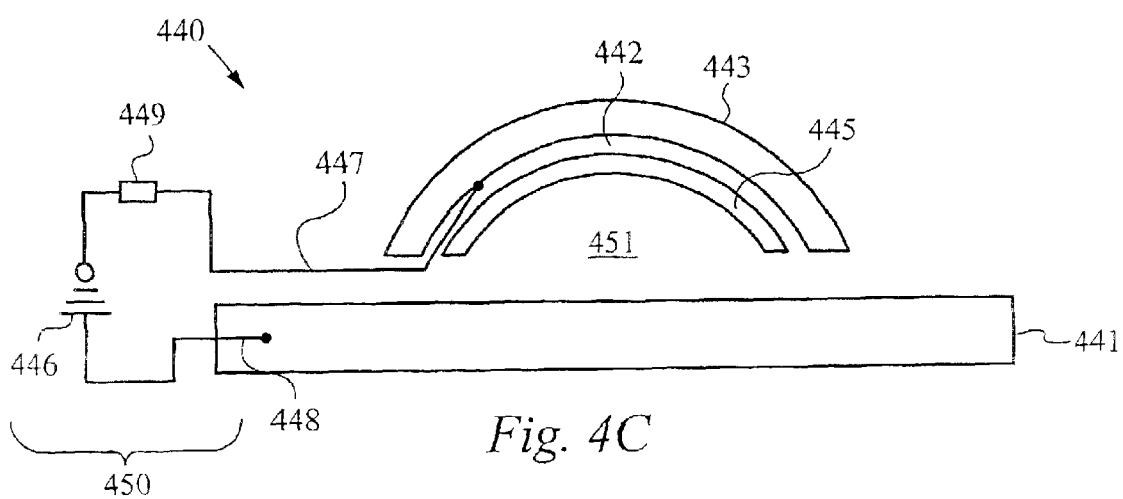

In accordance with yet further embodiments of the invention, a timing device 440 is coupled to a circuit 450, as shown in FIG. 4C. The device 440 comprises a lens 443, a metal base 441, a reactive medium 451 and a lens coating layer 445. The ionic reactive medium 451 is capable of depleting or dissolving the lens coating layer 445, either chemically or electrochemically as explained previously, when the device 440 is activated. After the device is activated and the lens coating layer 445 is sufficiently depleted or dissolved, the ionic reactive medium 451 provides an electrical path to close the circuit 450 between the leads 447 and 448. The circuit 450, in accordance with the embodiments of the invention, comprises a battery 446, and a piezo-electric element that generate an audible signal when the device 440 expires and the circuit 450 is closed.

In still further embodiments of the invention, a timing device comprises a galvanic cell or an electrolytic cell, wherein one or more electrochemically active materials between a transparent lens and a base, such as metal ions and/or electrodes, are configured to be plated out or depleted and alters the visibility of the base through the lens and indicating the passage of a duration of time. Where a timing device is an electrochemical-based timing device an actuator switch mechanism comprising electrical contacts can be used to actuate the device. The timing device, in accordance with still further embodiments of the invention, is in electrical communication with a thermosensor (not shown), wherein the thermosensor instructs the actuator switch to close a circuit between electrode elements of a galvanic or electrolytic cell within a range of temperatures.

The current invention has applications for marking when any number of different events need to take place and/or for timing the duration of any number of different events. For example, the timing device of the present invention has applications for indicating when perishable materials have expired and need to be thrown out, indicating the age of inventory and managing when the inventory needs to be rotated, tracking a deadline and a host of other time and/or temperature dependent events. One advantage of the present invention is that the timing device can be fabricated in two or more reactive parts, wherein the device is not activated, or sensitive to the environment (such as temperature), until the parts are coupled together, as explained in detail above. Accordingly, the shelf life of the timing device prior to use is enhanced and the sensitivity of the device to environmental conditions prior to use is reduced.

While the present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A device comprising:
   a. a lens;
   b. a base with a marking thereon; and
   c. means for altering visibility of the marking on the base through the lens and thereby indicating a passage of time, wherein the means for altering visibility of the marking on the base comprises an optical medium positioned between the lens and the base.

2. The device of claim 1, wherein the optical medium comprises a fluid material.

3. The device of claim 2, wherein the optical medium farther comprises a layer of opaque material which dissolves.

4. The device of claim 1, wherein the optical medium changes from opaque to transparent.

5. The device of claim 1, wherein the optical medium changes from transparent to opaque.

6. The device of claim 1, wherein the optical medium comprises a first material and a second material between the lens and the base and a membrane between the first material and the second material, wherein the first material dissolves the membrane and the first material reacts with the second material.

7. The device of claim 6, wherein the optical medium further comprises an indicating material which changes color when the first material reacts with the second material.

8. The device of claim 1, wherein the means for altering visibility of the marking on the base through the lens comprises a battery.

9. The device of claim 8, wherein the battery is a galvanic cell comprising an electrolyte medium, wherein a material within the electrolyte medium is plated between the base and the lens, thereby reducing the visibility of the marking on the base through the lens.

10. The device of claim 8, wherein the battery is a galvanic cell comprising an electrode between the base and the lens, wherein the electrode is depleted thereby increasing the visibility of the marking on the base through the lens.

11. The device of claim 8, wherein the battery is an electrolytic cell with an electrolyte medium, wherein a material within the electrolyte medium is plated between the lens and the base, thereby reducing the visibility of the marking on the base through the lens.

12. The device of claim 8, wherein the battery is an electrolytic cell with an electrode material between the lens and the base, wherein the electrode material is dissolved, thereby increasing the visibility of the marking on the base through the lens.

13. The device of claim 1, further comprising means to generate an audible signal when the passage of time is indicated.

14. The device of claim 1, further comprising a means to actuate the device.

15. The device of claim 14, wherein the means to actuate the device comprises a thermosensor, wherein the thermosensor actuates the device within a range of temperatures.

16. A device for indicating passage of a duration of time, the device comprising:
   a. a lens;
   b. a base;
   c. a layer positioned between the lens and the base; and
   d. means for altering transparency of the layer, thereby changing visibility of the base to indicate a passage of the duration of time.

17. The device of claim 16, wherein the means for altering the transparency of the layer converts the layer from opaque to transparent.

18. The device of claim 16, wherein the means for altering the transparency of the layer converts the layer from transparent to opaque.

19. The device of claim 16, wherein the means for altering the transparency of the layer comprises a fluid medium between the base and the lens.

20. The device of claim 16, wherein the means for altering the transparency of the layer is an electro-chemical means comprising an anode and a cathode.

21. The device of claim 16, wherein the means for altering the transparency of the layer is a chemical means, comprising a reactive medium for depleting the layer.

22. The device of claim 21, further comprising an indicator for indicating depletion of the layer.

23. A method of making a timing device comprising:
   a. forming a first reactive region on a first piece of tape; and
   b. forming a second reactive region on a second piece of tape, wherein at least one of the first piece of tape and the second piece of tape comprises an adhesive for securing the first reactive region and the second reactive region together and wherein at least one of the first reactive region and second reactive region comprises an optical medium that changes transparency when the first reactive region and the second reactive region are brought together, thereby indicating passage of a duration of time.

24. A method of making a timing device comprising:
   a. forming alternating first reactive regions and second reactive regions on a piece of tape; and
   b. forming a securing means on the tape, wherein a section of the tape comprising at least one of the first reactive regions and at least one of the second reactive regions is capable of being folded together and wherein at least one of the first reactive regions and the second reactive regions comprise an optical medium that changes transparency when the first reactive region and the second reactive region are folded together, thereby indicating a passage of a duration of time.

* * * * *